(12) United States Patent
Sim

(10) Patent No.: US 7,068,981 B2
(45) Date of Patent: Jun. 27, 2006

(54) APPARATUS AND METHOD FOR TRANSMITTING SIGNAL IN MOBILE COMMUNICATION SYSTEM

(75) Inventor: Dong Hi Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 442 days.

(21) Appl. No.: 10/392,950

(22) Filed: Mar. 21, 2003

(65) Prior Publication Data

US 2003/0181170 A1   Sep. 25, 2003

(30) Foreign Application Priority Data

Mar. 21, 2002   (KR)   .................. 10-2002-0015358

(51) Int. Cl.
*H03C 7/02*   (2006.01)
*H04B 1/02*   (2006.01)
*H04B 7/02*   (2006.01)
*H04B 1/66*   (2006.01)
*H04M 1/00*   (2006.01)

(52) U.S. Cl. .................. 455/101; 455/102; 455/103; 455/562.1

(58) Field of Classification Search ......... 455/101–103
See application file for complete search history.

(56) References Cited

U.S. PATENT DOCUMENTS

| 6,760,388 B1* | 7/2004 | Ketchum et al. ........... 375/295 |
| 2002/0127978 A1* | 9/2002 | Khatri ........................ 455/103 |
| 2005/0078761 A1* | 4/2005 | Hottinen et al. ............ 375/267 |
| 2005/0130694 A1* | 6/2005 | Medvedev et al. ......... 455/522 |
| 2005/0248497 A1* | 11/2005 | Chun et al. ................. 343/853 |

FOREIGN PATENT DOCUMENTS

| JP | 09-232848 | 9/1997 |
| JP | 10-070494 | 3/1998 |
| JP | 10-200321 | 7/1998 |

* cited by examiner

*Primary Examiner*—Curtis Kuntz
*Assistant Examiner*—Michael T. Thier
(74) *Attorney, Agent, or Firm*—Fleshner & Kim, LLP

(57) ABSTRACT

A signal transmission apparatus and method for a mobile communication system are disclosed. Beamforming is performed on each symbol using the correlation as well as the independence between antennas, and then the beamformed symbols are transmitted. Thus, both the correlation between antennas and the independence between antennas are all considered, so that the gain according to the correlation between antennas can be also obtained. In addition, the additional gain would lead to enhancement of the symbol detection capability of the sending end, so that performance of the MIMO system can be remarkably heightened.

11 Claims, 9 Drawing Sheets

APPARATUS AND METHOD FOR TRANSMITTING SIGNAL IN MOBILE COMMUNICATION SYSTEM

BACKGROUND OF THE INVENTION

1. Field of the Invention

The present invention relates to a mobile communication system and, more particularly, to a signal transmission method and apparatus for a mobile communication system using multiple antennas.

2. Description of the Background Art

Recently, with the rapid growth in the radio mobile communication markets, diverse multimedia services are in a great demand in the radio environment, and especially, as a transmit data is growingly increased and a data transmission speed becomes fast. Therefore, finding a way to efficiently use a limited frequency is the most critical task. In an effort to cope with the subject, a fresh transmission technique using multiple antennas is required for use, and one example of which is a multiple input multiple output (MIMO) system using the multiple antenna.

FIG. 1 illustrates one example of a general mobile communication system adopting a MIMO system.

As shown in FIG. 1, a conventional MIMO system includes: a plurality of transmit antennas 12, a vector encoder 10 for transmitting sequentially generated transmit data (symbols) to each transmit antenna 12; a plurality of receive antennas 14; and a V-BLAST signal processor 16 for processing data received through the receive antennas 14 in a V-BLAST (Vertical-Bell Labs Layered Space Time Architecture) method, and estimating and demodulating a transmit data.

The vector encoder 10 converts the sequentially generated transmit data in a serial-to-parallel method and transmits them to each transmit antenna 12.

The V-BLAST METHOD is a sort of a transmission technique of a MIMO mobile communication system using multiple antennas, for which M number of transmit antennas 12 and N number of receive antennas 14 are used. FIG. 1 shows the case of using 4 transmit antennas 12, but without being limited thereto, two or more antennas can be set arbitrarily.

The signal processing operation of the general MIMO mobile communication system constructed as described above will now be explained.

Without performing a certain signal processing for enhancing a transmission quality on the transmit data, the vector encoder 10 simply processes the transmit data a1–a4 in parallel and transmits them to each antenna 12. Then, each transmit antenna 12 transmits each different transmit data in the air.

Data received through each receive antenna 14 is inputted to the V-BLAST signal processor 16, and the V-BLAST signal processor 16 performs a signal processing suitably, that is, in a V-BLAST method, and detects the transmit data a1–a4.

The operation of the V-BLAST signal processor 16 will now be described in detail.

When the transmit antenna 12 of the transmit antenna array transmit a different transmit data (transmit symbol) to each other, the V-BLAST signal processor 16 receives the reception signals from each receive antenna 14 of the receive antenna array and constructs a reception data vector (receive vector). Subsequently, the V-BLAST signal processor 16 detects a transmission signal by using the receive vector.

In this respect, while the V-BLAST signal processor 16 detects the transmit symbol a specific transmit antenna has transmitted, it regards transmit symbols other transmit antennas 12 have transmitted as an interference signal.

Thus, the V-BLAST signal processor 16 calculates a weight vector of each receive antenna 14 for each symbol transmitted from each transmit antenna 12 and simultaneously subtracts the first detected symbol component from the receive vector, thereby estimating each symbol while minimizing influence of each symbol.

FIG. 2 is a flow chart of a method for estimating the transmit symbol by the V-BLAST signal processor 16.

First, the V-BLAST signal processor 16 constructs the signals received through each receive antenna 14 as receive vectors (step S11).

For example, in case of a MIMO mobile communication system having M number of transmit antennas 12 and N number of receive antennas 14, assuming that a signal vector (transmit vector) transmitted through the M number of transmit antennas 12 is 'a' and a matrix of a mobile communication channel (channel matrix) through which the transmit vector is transmitted is 'H', the receive vector (R) can be expressed by the following equation (1):

$$R = H \times a + v \qquad (1)$$

At this time, since the signals transmitted from the M number of transmit antennas 12 are received through the N number of receive antennas 16 through a different path, the channel matrix (H) can be expressed by N×M matrix. The channel matrix (H) is obtained through estimation by the V-BLAST signal processor 18. 'v' in equation (1) is a Gaussian noise, Since the noise is induced to each receive antenna 14, 'v' is N×1 vector.

Consequently, the signals transmitted through the M number of transmit antennas 12 pass through a different communication channel ($h_{i,j}$), and the V-BLAST signal processor 16 receives the signals through the N number of receive antennas 14.

Upon receiving them, the V-BLAST signal processor 16 calculates each weight vector of the signals, and estimates symbols transmitted from each transmit antenna 12 by using the calculated weight vector and the receive vector.

First, a method for calculating the weight vector will now be described.

In order to a receiving end to detect the symbols transmitted from the M number of transmit antennas 12, signals received by the N number of receive antennas are inner-producted by a weight vector which is defined as 'w'. Since different symbols are transmitted through the M number of transmit antennas 12, the M number of weight vectors are required for the V-BLAST signal processor 18 to detect the transmit symbols. At this time, the weight vector (w) should satisfy the following quality.

$$w_i^H \times H_j = \begin{cases} 0 & (j \geq i) \\ 1 & (j = i) \end{cases} \qquad (2)$$

wherein $H_j$ indicates a vector in the jth column of the channel matrix (H) which can be estimated by the V-BLAST signal processor 18.

In equation (2), the weight vector (wi), which should be inner-producted to a corresponding receive vector so as for the ith transmit antenna to detect a symbol transmitted from the antenna, has a property that it is '1' only when inner-producted to the ith column vector of the channel matrix (H)

and '0' when inner-producted to the other remaining column vectors of the channel matrix (H).

That is, in the case of the weight vector (wi) for detecting the ith transmit symbol, influence of symbols transmitted through other transmit antennas should be removed.

In addition, the transmit symbols are sequentially detected, and when the weight vector to be used for detecting a current symbol is obtained, since any influence of the previously detected symbols should be excluded, the expression 'j≧1' is used in equation (2).

Thus, the weight vector satisfying the quality of equation (2) can be obtained as follows: To begin with, the receive vector of equation (1) can be expressed by the following equation (3):

$$R=a_1H_1+a_2H_2+\ldots+a_MH_M \quad (3)$$

In general, symbols transmitted from each transmit antenna 12 are received by the receiving end through each different channel, and equation (3) expresses the receive vector with the received symbols as a shape of a linear sum.

As noted in equation (3), when the first transmit symbol is detected, it is preferred that influence of second to Mth symbols is removed and the weight vector is then inner-producted to the receive vector. The same principle can be applied to the case of detecting other transmit symbols.

When a specific transmit symbol is detected, in order for a corresponding weight vector not to be influenced from other transmit symbols, the V-BLAST signal processor 16 updates the weight vector for every transmit symbol to be detected and uses it.

Once the receive vector (R) is constructed and the channel matrix (H) is estimated, the V-BLAST signal processor 16 starts updating a weight vector in order to obtain a weight vector for each transmit symbol to be detected.

For this purpose, as noted in the below equation (4), the V-BLAST signal processor 16 obtains a m oore-penrose pseudoinverse matrix ($H^+$ or $G_1$) for the estimated channel matrix (H) (step S13).

$$G1 = H+ \quad (4)$$

After obtaining the Moore-Penrose pseudoinverse matrix, the V-BLAST signal processor 16 selects a row vector with the smallest vector norm value from row vectors of a G1 matrix, as a weight vector (step S15).

For instance, on the assumption that the selected row vector is the Kth row vector, the Kth line of the G1 matrix is selected as a weight vector ($w_K$) for detecting the Kth transmit symbol.

After the weight vector ($W_K$) is selected, the V-BLAST signal processor 16 inner-products the receive vector (r) and the weight vector ($W_K$) to estimate a symbol transmitted from the Kth transmit antenna (step S17).

The receiving end, that is, the V-BLAST signal processor 16, is well aware of a modulation method (i.e., QPSK, QAM, etc.) used in a sending end of the MIMO mobile communication system. Thus, as the V-BLAST signal processor 18 is able to recognize which constellation the estimated symbol belongs to, it determines the estimated symbol as a transmit symbol (ak) transmitted form the Kth transmit antenna.

The V-BLAST signal processor 18 checks whether the M number of transmit symbols transmitted from the M number of transmit antennas 12 have been all detected (step S21). If there still remains transmit symbols to be detected, the V-BLAST signal processor 18 performs a procedure for updating the weight vector in order to detect the remaining transmit symbols.

First, when Kth symbol ($a_k$) is detected, as shown in the below equation (5), the V-BLAST signal processor 18 removes influence of the Kth symbol ($a_KH_K$) from the receive vector (r) of equation (3) to obtain a receive vector ($r_2$) to be used for the second updating (step S23).

$$r_2 = r - a_K H_K \quad (5)$$

After the receive vector ($r_1$) is obtained, the V-BALST signal processor 18 estimates a channel matrix ($H_2$) to be used to obtain $G_2$, that is, the second weight vector (step S25). Namely, the V-BLAST signal processor 16 deletes the column vector (Kth column) corresponding to the detected transmit symbol ($a_k$) from the previous channel matrix (H) and estimates a new channel matrix ($H_2$).

Subsequently, advancing to the step (S13), the V-BLAST signal processor 16 calculates the Moore-Penrose pseudoinverse matrix of the estimated channel matrix ($H_2$) as shown in the below equation (6):

$$G2 = \underline{H}\frac{+}{K} \quad (6)$$

The V-BLAST signal processor 18 selects a row vector with the smallest vector norm from row vectors of the $G_2$ matrix, as a weight vector (step S15). For instance, assumption that the selected row vector is the Vth row vector, the Vth line of the $G_2$ matrix is used as a weight vector ($w_v$) for detecting the Vth transmit symbol.

After the weight vector ($w_v$) is selected, the V-BLAST signal processor 16 inner-products the receive vector ($r_2$) and the weight vector ($w_v$) to estimate a symbol transmitted from the Vth transmit antenna (step S17).

As stated above, the V-BLAST signal processor 18 is already aware of the digital modulation method used in the sending end of the MIMO mobile communication system, it can judge which constellation the estimated symbol belongs to, based on which the V-BLAST signal processor detects a symbol ($a_v$) transmitted from the Vth transmit antenna. (step S19).

Thereafter, the V-BLAST signal processor 18 checks whether the M number of transmit symbols transmitted from the M number of transmit antennas 12 have been all detected (step S21). If not all transmit symbols have been detected, the operations after the steps S23 and S25 are repeatedly performed. If all the transmit symbols have been detected, the steps are terminated.

As stated above, in the general MIMO mobile communication system, the transmit symbol is simply converted serial-to-parallel without being subjected to an additional signal processing, and then transmitted through the transmit antennas. Then, the receiving end sequentially detects the transmit data each transmit antenna has transmitted. At this time, the symbols transmitted independently from each transmit antenna should maintain their independence while passing through the mobile communication channel.

However, practically, since transmit antennas of a transmit antenna array are correlated to a degree and so do the receive antennas, the independence of the signals transmitted from each transmit antenna may not be guaranteed in some situation.

In addition, as for the mobile communication channel, an independent channel should be guaranteed between each transmit antenna and each receive antenna. But, in some cases, actually, independent channels as many as the transmit antennas are not guaranteed. Especially, in case of a system using only the independence between antennas, the greater the correlation between antennas, the more a signal gain is degraded. Thus, in such a case, a method of using the correlation of the antennas should be also considered.

However, in the conventional art, the symbols are transmitted simply in consideration of only the independence signal transmission between antennas The above references are incorporated by reference herein where appropriate for appropriate teachings of additional or alternative details, features and/or technical background.

SUMMARY OF THE INVENTION

Therefore, an object of the present invention is to provide a signal transmission method and apparatus for a mobile communication system using an independence and a correlation between antennas Another object of the present invention is to provide a signal transmission method that is capable of enhancing a symbol detecting capability of a receiving end in a mobile communication system.

Still another object of the present invention is to provide a signal transmission method in which beamforming is performed on each symbol and the beamformed symbol is assigned to a transmit antenna.

To achieve at least the above objects in whole or in parts, there is provided a signal transmission method for a mobile communication system using multiple antennas, including the steps of: demultiplexing a symbol to be transmitted; performing a beamforming on each demultiplexed symbol; and transmitting the beamformed signal through each transmit antenna.

In the signal transmission method of the present invention, preferably, the beamforming is performed by multiplying each symbol to be transmitted by a weight vector.

In the signal transmission method of the present invention, preferably, the weight vector is an eigenvector feedback from a receiving end or a eigenvector calculated in a sending end.

In the signal transmission method of the present invention, preferably, power of each symbol is adjusted by an eigenvalue. In this case, the eigenvalue is calculated in the sending end or feedback from the receiving end.

To achieve at least these advantages in whole or in parts, there is further provided a signal transmission method for a mobile communication system using multiple antennas including the steps of: demultiplexing a symbol to be transmitted; receiving a weight vector from a receiving end; multiplying the demultiplexed symbol and the weight vector and performing a beamforming on each symbol; and transmitting the beamformed signal through each transmit antenna.

In the signal transmission method of the present invention, preferably, the weight vector is an eigenvector.

The signal transmission method for a mobile communication system further includes the steps of: receiving an eigenvalue from the receiving end; and adjusting power of each symbol by using the received eigenvalue.

To achieve at least these advantages in whole or in parts, there is further provided a signal transmission method for a mobile communication system using multiple antennas including the steps of: demultiplexing a symbol to be transmitted; receiving a channel matrix from a receiving end; eigen-decomposing the channel matrix and calculating an eigenvector and an eigenvalue; multiplying the demultiplexed symbol and the eigenvector and performing a beamforming on each symbol; and transmitting the beamformed signal through each transmit antenna.

The signal transmission method of the present invention further includes: a step of adjusting power of each symbol by using the calculated eigenvalue.

To achieve at least these advantages in whole or in parts, there is further provided a signal transmission apparatus for a mobile communication system using multiple antennas including: a multiplexer for demultiplexing sequentially inputted symbols; a beamforming unit for performing a beamforming on each demultiplexed symbol in consideration of a correlation between antennas; and a plurality of transmit antennas for transmitting the beamformed signals.

The signal transmission apparatus for a mobile communication system of the present invention further includes: a vector estimation unit for estimating a transmit vector from collected signals by using a certain method; and a symbol detector for performing a beamforming on the estimated transmit vector and detecting a transmit symbol.

In the signal transmission apparatus of the present invention, preferably, the certain method is a zero-forcing or a minimum mean square error (MMSE).

The signal transmission apparatus for a mobile communication system of the present invention further includes: a channel estimation unit for estimating a channel matrix from collected signals; and an eigen decomposition unit for eigen-decomposing the estimated channel matrix, calculating an eigenvector and an eigenvalue, and feeding them back to the sending end.

In the signal transmission apparatus of the present invention, preferably, the beamforming unit performs the beamforming by multiplying each symbol to be transmitted by a weight vector.

In the signal transmission apparatus of the present invention, preferably, the weight vector is an eigenvector feedback from the receiving end or an eigenvector calculated in the sending end.

In the signal transmission apparatus of the present invention, preferably, the beamforming unit adjusts power of each symbol by using the eigenvalue. In this case, the eigenvalue is calculated in the sending end or is fedback from the receiving end.

To achieve at least these advantages in whole or in parts, there is further provided a signal transmission apparatus for a mobile communication system using multiple antennas including: a demultiplexer for demultiplexing sequentially inputted symbols; an eigen decomposition unit for eigen-decomposing a channel matrix feedback from a receiving end and calculating an eigenvector and an eigenvalue; a beamforming unit for performing a beamforming on each symbol; and a plurality of transmit antennas for transmitting the beamformed signals by an eigenvector and an eigenvalue.

The signal transmission apparatus for a mobile communication system of the present invention further includes: a vector estimation unit for estimating a transmit vector from the collected signals; a symbol detector for performing a beamforming on the estimated transmit vector and detecting a transmit symbol; and a channel estimation unit for estimating a channel matrix from the collected signals and feeding it to the sending end.

In the signal transmission apparatus of the present invention, preferably, the beamforming unit adjusts power of each symbol by using an eigenvalue.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Preferred embodiments of the present invention will now be described with reference to the accompanying drawings.

As afore-mentioned, in the conventional V-BLAST system, in the case that the M number of transmit antennas are used, the sending end generates a signal vector $\underline{S}$ having the M number of symbols and transmits the N number of symbols through each transmit antenna as shown in the below equation:

$$S=[s_1, s_2, s_3, \ldots, s_M]^T$$

In the conventional V-BLAST system, however, each antenna is operated simply as an independent channel without considering the correlation between antennas. That is, in the case of using the system using the dependence between antennas, the greater the correlation between antennas, the more the gain is degraded. In such a case, the gain degradation caused due to the correlation between antennas can be effectively prevented by also employing a method using the correlation between antennas.

Thus, the present invention proposes a method for enhancing a system performance by also considering the correlation as well as the independence between antennas. For this purpose, in the present invention, paying attention to the fact that the sending end is constructed with an antenna array, beamforming is performed on each symbol before transmitting each symbol. In this case, the higher the correlation between antennas is, the more the gain obtained by performing the beamforming is increased.

Figure 1:
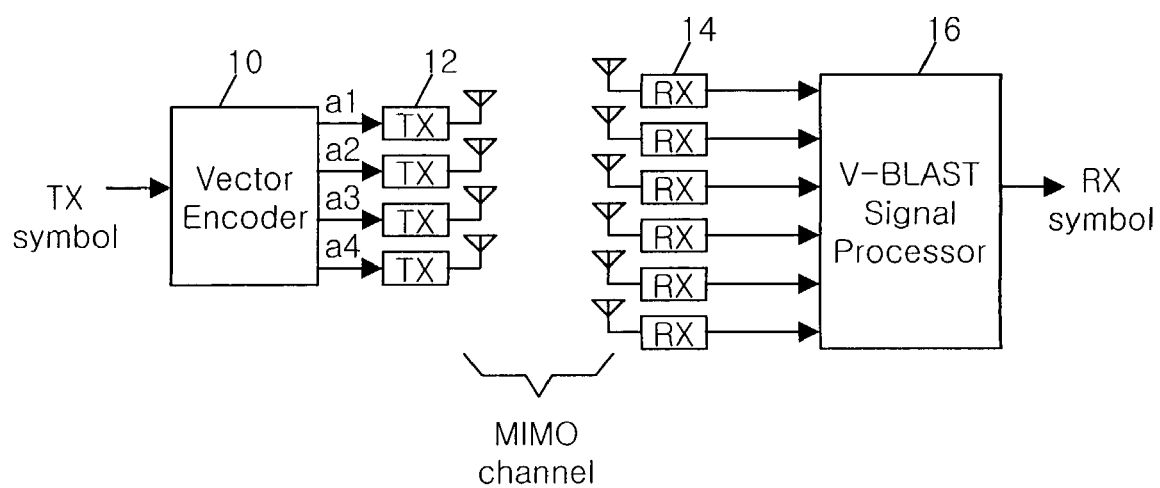
FIG. 1 illustrates the construction of a MIMO system in accordance with a conventional art.
Figure 2:
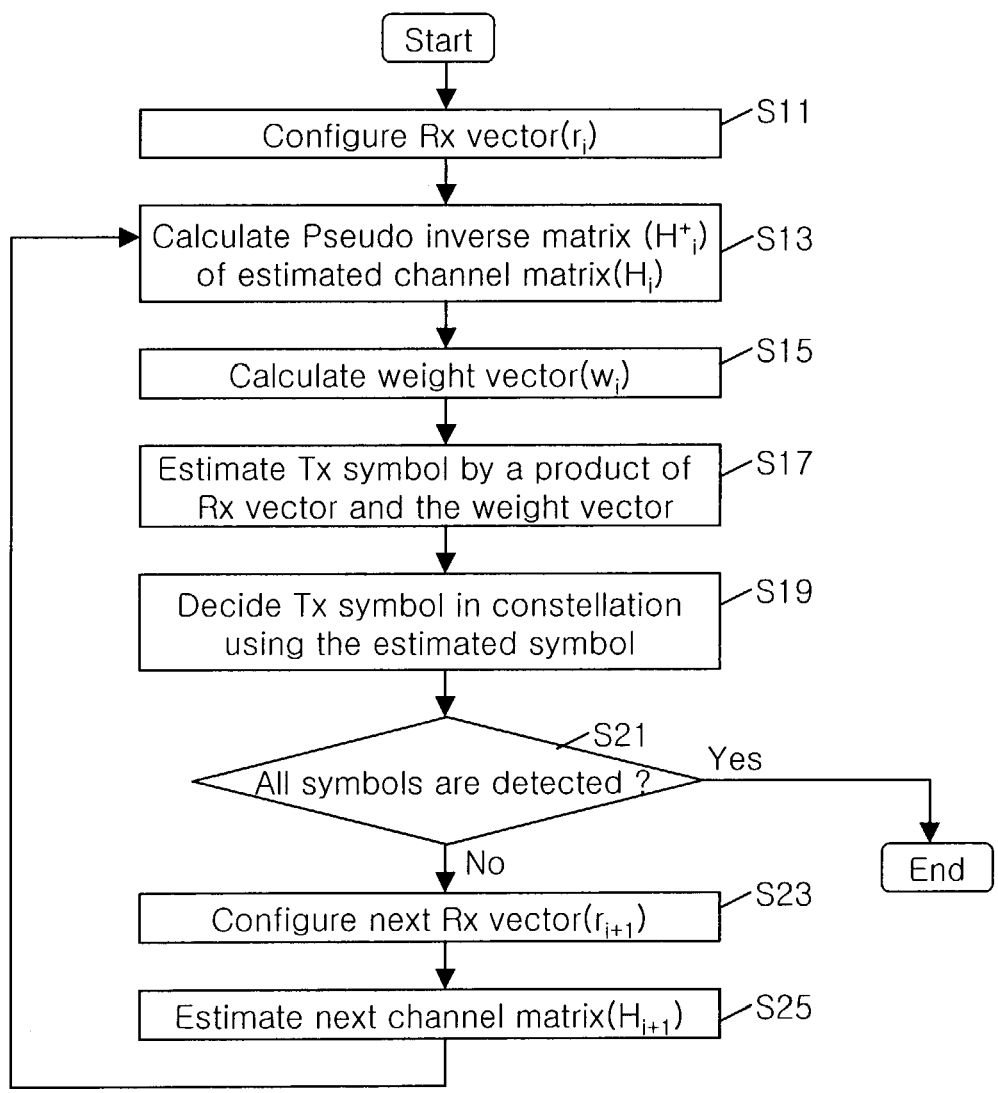
FIG. 2 is a flow chart of a signal processing method of the MIMO system in accordance with the conventional art.
Figure 3:
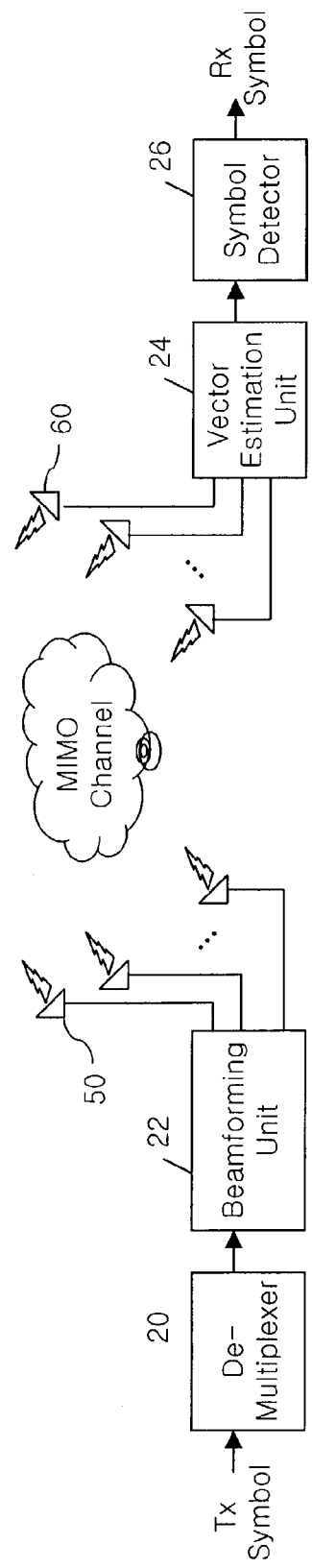
FIG. 3 illustrates the construction of a signal transmission apparatus for a mobile communication system using multiple antennas in accordance with a first embodiment of the present invention.

FIG. 3 illustrates the construction of the signal transmission apparatus for a mobile communication system in accordance with a first embodiment of the present invention.

As shown in FIG. 3, a signal transmission apparatus for a mobile communication system in accordance with the first embodiment of the present invention includes: a demultiplexer 20 for demultiplexing sequentially inputted symbols; a beamforming unit 22 for performing a beamforming on each demultiplexed symbol in consideration of a correlation between antennas; a plurality of transmit antennas 50 for transmitting the beamformed signals; a plurality of receive antennas 60 for collecting signals transmitted from the transmit antennas 50; a vector estimation unit 24 for estimating a transmit vector from the signals received by the receive antennas 60; and a symbol detector 26 for performing a beamforming on the estimated transmit vector and detecting transmission (Tx) symbols.

The beamforming unit 22 performs the beamforming by multiplying each symbol by a weight vector, and the symbol detector 26 performs the beamforming by multiplying the estimated transmit vector by a conjugate value of the weight vector which has been inner-producted to each symbol in the transmission end.

The vector estimation unit 24 estimates the transmit vector by using the zero-forcing or the minimum mean square error (MMSE) method.

Figure 4:
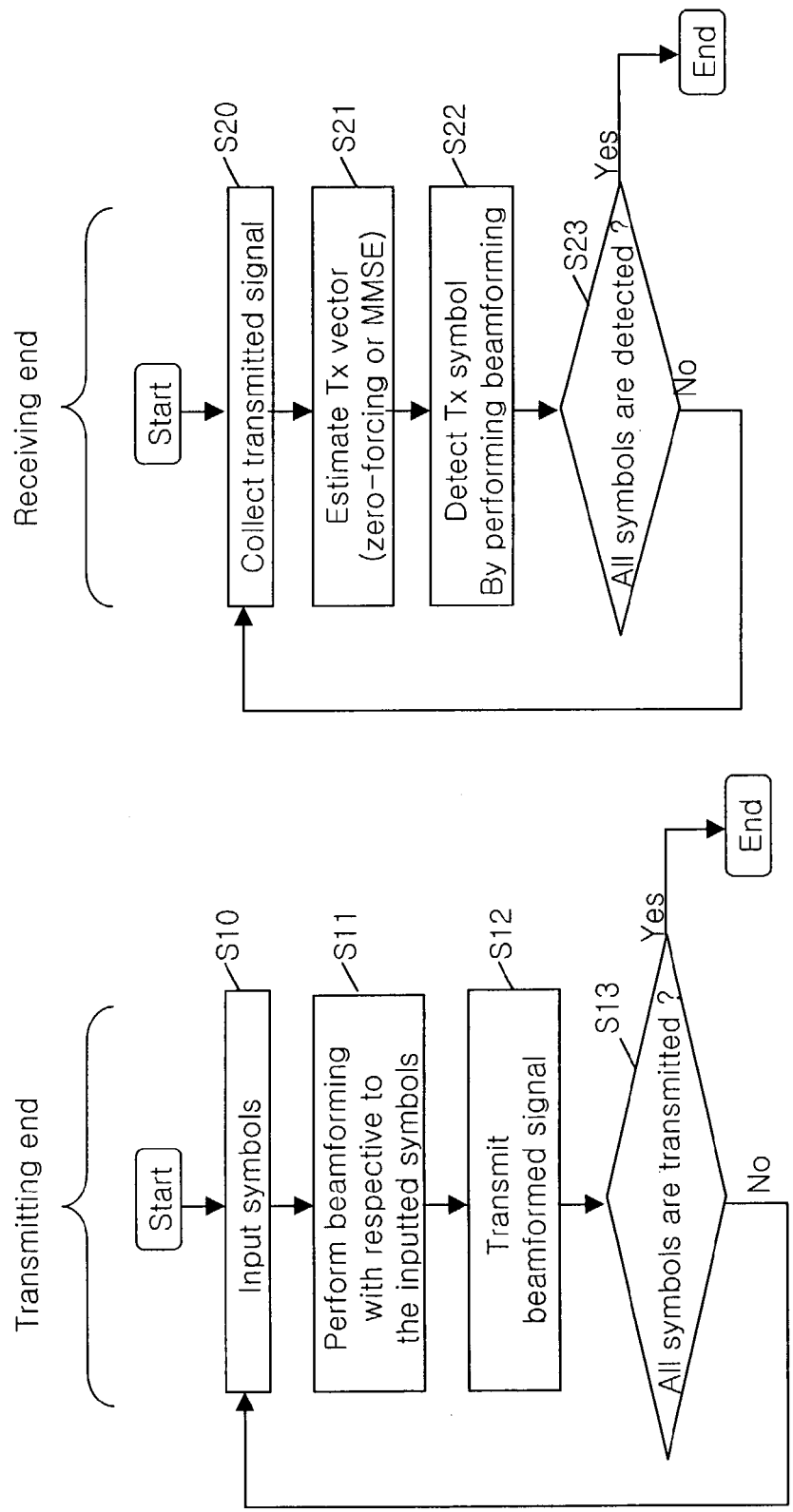
FIG. 4 is a flow chart of a signal transmission method of FIG. 3.

The operation of the signal transmission apparatus for a mobile communication system in accordance with the first embodiment of the present invention will now be described with reference to FIGS. 3 and 4.

To begin with, it is assumed that there are provided the M number of transmit antennas 50 and the N number of receive antennas 60, and in this case, a channel matrix ($\underline{H}$) is N×M matrix.

When a to-be-transmitted symbol is inputted (step S10), the demultiplexer 20 demultiplexes the input symbols and outputs them to the beamforming unit 22. Then, the beamforming unit 22 inner-products each demultiplexed symbol by a weight vector to perform a beamforming on each symbol (step S11).

$$\underline{S}=w_1 a_1+w_2 a_2+w_3 a_3+ \ldots +w_M a_M \qquad (1)$$

wherein $\underline{w}_t$ is a weight vector, and $\underline{S}$ is a signal vector after performing the beamforming.

Accordingly, the plurality of transmit antennas independently transmit the beamformed signals to the receiving end (step S12). Thereafter, the sending end checks whether every symbol has been transmitted (step S13). If there remains a symbol to be transmitted, the operations after the step S10 are repeatedly performed to perform the beamforming on each symbol ($a_1, a_2, a_3, \ldots, a_M$).

Signals transmitted from the sending end are collected through the receive antennas 60 of the receiving end (step S20). In this respect, however, since the signals transmitted from the sending end have undergone the beamforming process, the conventional V-BLAST signal processing can not be used in the receiving end.

Thus, the vector estimation unit 24 of the receiving end estimates a transmission signal vector (transmit vector) by using the zero-forcing or the minimum mean square error (MMSE) method (step S21). In such a case, estimation of the transmit vector by the zero-forcing and the MMSE method is performed as follows:

First, the signal (R) received by the receiving end can be expressed by the following equation (2):

$$\underline{R} = \underline{H}\underline{S} + \underline{n} \quad (2)$$

wherein $\underline{n}$ indicates Additive White Gaussian Noise(AWGN).

And the signal vector ($\underline{\hat{S}}$) estimating the transmission signal vector (transmit vector) ($\underline{S}$) by using the zero-forcing can be expressed by the following equation (3):

$$\underline{\hat{S}} = [\underline{H}^H \underline{H}]^{-1} \underline{H}^H \underline{R} \quad (3)$$

wherein $\underline{H}$ is a channel matrix and $\underline{H}^H$ signifies a Hermitian operation.

The signal vector ($\underline{\hat{S}}$) estimating the transmit vector ($\underline{S}$) by using the MMSE method can be expressed by the following equation (4):

$$\underline{\hat{S}} = [\alpha \underline{I} + \underline{H}^H \underline{H}]^{-1} \underline{H}^H \underline{R} \quad (4)$$

wherein α is a Signal-to-Noise Ratio (SNR), and $\underline{I}$ is an identity matrix.

After the beamforming is performed on each symbol and the transmitted signal vector ($\underline{\hat{S}}$) is estimated by using the zero-forcing or the MMSE method, the symbol detector 26 inner-products the signal vector ($\underline{\hat{S}}$) by the conjugate value of the weight vector which has been inner-producted to each symbol and transmitted from the sending end (that is, performing beamforming), and detects estimated symbols ($\hat{s}_1, \hat{s}_2, \hat{s}_3, \ldots, \hat{s}_M$) on the transmit symbols ($s_1, s_2, s_3, \ldots, s_M$). This can be expressed by the following equation (5):

$$\hat{s}_1 = \underline{w}_1^H \underline{\hat{S}} \quad (5)$$
$$\vdots$$
$$\hat{s}_M = \underline{w}_M^H \underline{\hat{S}}$$

In general, in the MIMO mobile communication system, the receiving end is aware of the modulation method used in the sending end. Thus, the symbol detector 26 recognizes positions of the estimated symbols ($\hat{s}_1, \hat{s}_2, \hat{s}_3, \ldots, \hat{s}_M$) from the constellation and finally detects the transmit symbols ($s_1, s_2, s_3, \ldots, s_M$) (step 22).

Thereafter, the receiving end checks whether every symbol has been detected (step 23), and if there still remains a symbol to be detected, the operations after the step S20 are repeatedly performed.

As stated above, in the present invention, in the case that symbols are transmitted at one time suitably to the number of the transmit antennas, the beamforming is performed independently on each symbol and the signals are transmitted.

The MIMO system can be implemented by two types of a frequency division duplex (FDD) system and a time division duplex (TDD) system.

In the case of the FDD system, since the sending end can not recognize a mobile channel situation from the sending end to the receiving end, it is provided with a forward channel situation from the receiving end. Meanwhile, in the case of the TDD system, since the forward channel and a backward channel are the same, the sending end does not need to receive any channel information from the receiving end.

There are two methods for calculating the weight vector in the sending end.

The first method is that the sending end obtains a weight vector which is to be inner-producted to each symbol by using a channel matrix (in the case of the TDD system), and the second method is that the sending end receives a weight vector from the receiving end (in the case of the FDD system).

Figure 5:
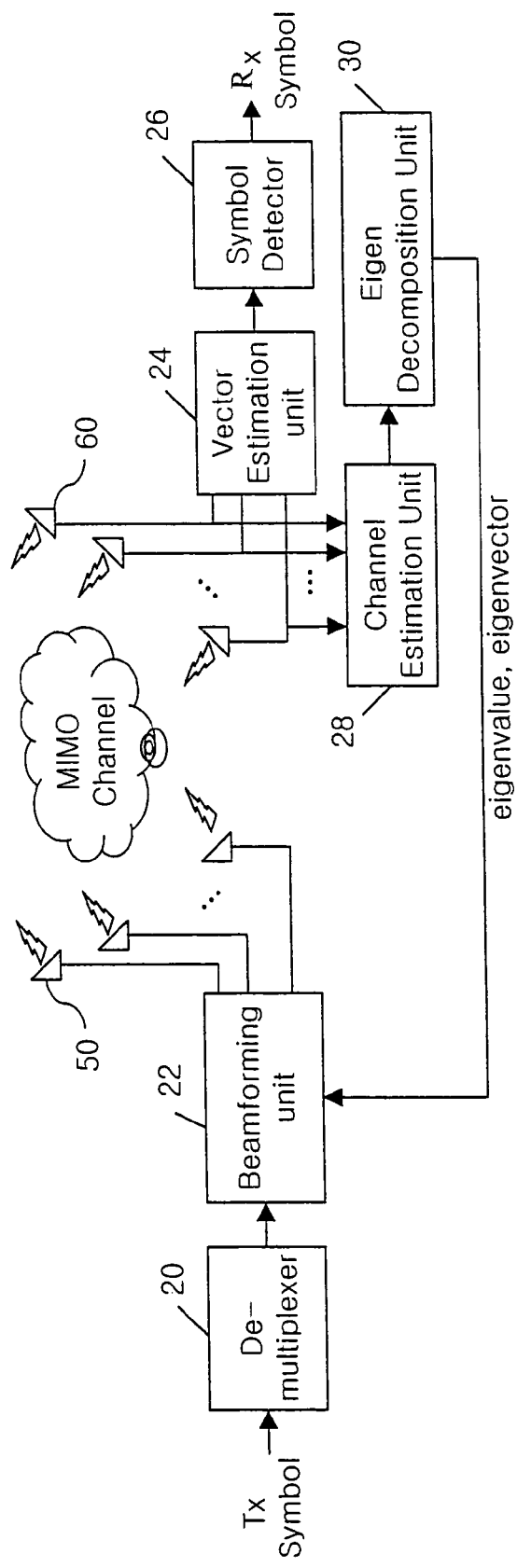
FIG. 5 illustrates the construction of a signal transmission apparatus for a mobile communication system using multiple antennas in accordance with a second embodiment of the present invention.

FIG. 5 illustrates the construction of a signal transmission apparatus for a mobile communication system using multiple antennas in accordance with a second embodiment of the present invention.

As shown in FIG. 5, the signal transmission apparatus of the second embodiment of the present invention additionally includes a channel estimation unit 28 and an eigen decomposition unit 30.

The channel estimation unit 28 estimates a channel matrix ($\underline{H}$) from the signals collected from the plurality of receive antennas 60, and the eigen decomposition unit 30 performs a eigen-decomposition on the estimated channel matrix ($\underline{H}$) to obtain an eigenvalue and an eigenvector, and then feeds back them to the beamforming unit 22.

Then, the beamforming unit 22 of the sending end performs a beamforming on the symbols by using the eigenvector value as a weight vector, and at the same time, adjusts transmission power of each symbol in proportion to the eigenvalue.

Figure 6:
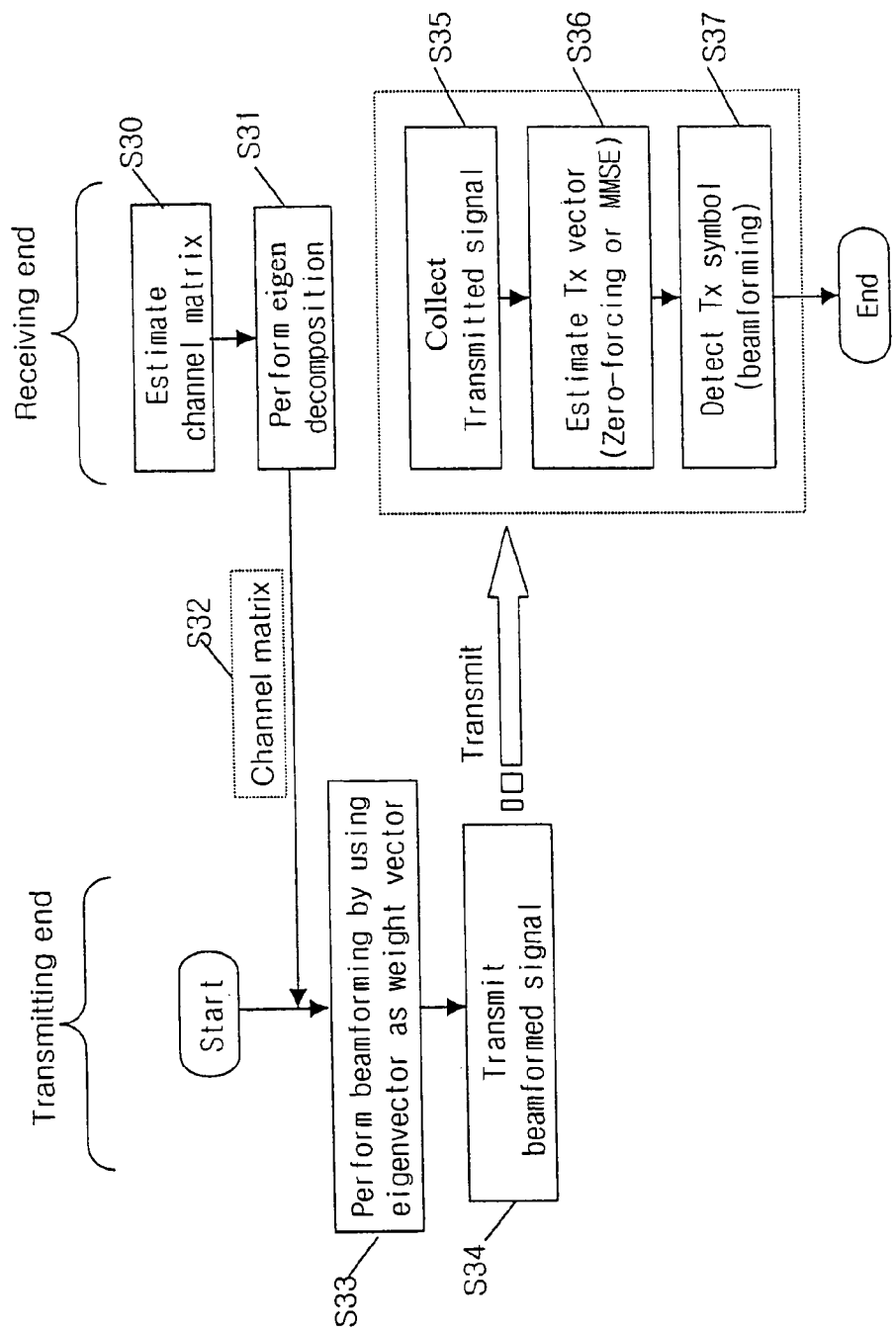
FIG. 6 is a flow chart of a signal transmission method of FIG. 5.

The operation will now be described in detail with reference to FIGS. 5 and 6.

To begin with, in the present invention, it is assumed that the MIMO system includes the M number of transmit antennas 50 and the N number of receive antennas 60, and the MIMO system is the FDD system. The matrix of mobile communication channel a signal vector transmitted from the sending end passes through is $\underline{H}$, and the channel matrix ($\underline{H}$) is an N×M matrix. In case that the sending end/the receiving end transmits a previously agreed pilot symbol or a separate pilot channel, the receiving end can estimate each component of the channel matrix ($\underline{H}$) (step S30).

Once the channel matrix ($\underline{H}$) is estimated by the channel estimation unit 28, the eigen decomposition unit 30 performs an eigen-decomposition of the channel matrix ($\underline{H}$) to obtain an eigenvalue to feedback and an eigenvector (step S31).

In this connection, however, since the MIMO system of the present invention is assumed to have more receive antennas 60 (N) than the transmit antennas 50 (M), the channel matrix ($\underline{H}$) is not a square matrix. Thus, since the eigen decomposition unit 30 of the receiving end is not able to eigen-decompose the channel matrix ($\underline{H}$) itself, it performs an eigen-decomposition of $\underline{H}^H \times \underline{H}$. In this case, 'H' signifies the Hermitian operation.

$$\underline{H}^H \underline{H} \Rightarrow \lambda_1 \underline{e}_1 + \lambda_2 \underline{e}_2 + \lambda_3 \underline{e}_3 + \ldots + \lambda_M \underline{e}_M \quad (6)$$

wherein $\lambda_i$ indicates eigenvalues of the matrix $\underline{H}^H \underline{H}$, and $e_i$ indicates eigenvectors.

The eigenvector ($\underline{e}_1, \underline{e}_2, \underline{e}_3, \ldots, \underline{e}_M$) maintains an orthogonality. Thus, even though symbols as many as the transmit antennas are transmitted at one time, notably, the beamforming on each symbol is independent.

After the eigenvalues ($\lambda_1, \lambda_2, \lambda_3, \ldots, \lambda_M$) and the eigenvectors ($e_1, e_2, e_3, \ldots, \underline{e}_M$) are obtained, the eigen decomposition unit 30 feeds back the corresponding values to the beamforming unit 22 of the receiving end (step S32).

Then, the beamforming unit 22 replaces the eigenvectors ($\underline{e}_1, \underline{e}_2, \underline{e}_3, \ldots, \underline{e}_M$) with weight vectors ($\underline{w}_1, \underline{w}_2, \underline{w}_3, \ldots,$ $w_M$) to perform a beamforming on each symbol (step S33), and transmits the beamformed signal through each transmit antenna 50 (step S34).

Unlike the conventional art in which the beamforming is formed on each symbol to make signal power of each symbol the same and be transmitted, in the present invention, the beamforming unit 22 can adjust the power of each symbol according to the eigenvalues ($\lambda_1, \lambda_2, \lambda_3, \ldots, \lambda_M$) and transmits them.

Similar to the first embodiment of the present invention, signals transmitted from the sending end are collected through the receive antennas 60 of the receiving end (step S35). The vector estimation unit 24 of the receiving end estimates a transmission signal vector (transmit vector) by using the zero-forcing or the minimum mean square error (MMSE) method (step S36). In general, in the MIMO mobile communication system, the receiving end is aware of the modulation method used in the sending end. Thus, the symbol detector 26 recognizes positions of the estimated symbols from the constellation and finally detects the transmit symbols (step S37). Thereafter, the receiving end checks whether every symbol has been detected and if there still remains a symbol to be detected, the operations from step S35 to step S37 are repeatedly performed.

In the second embodiment of the present invention, estimation of the channel matrix and eigen-decomposition of the channel matrix are all performed in the receiving end, but without being limited thereto, the eigen-decomposition can be also performed in the sending end.

Figure 7:
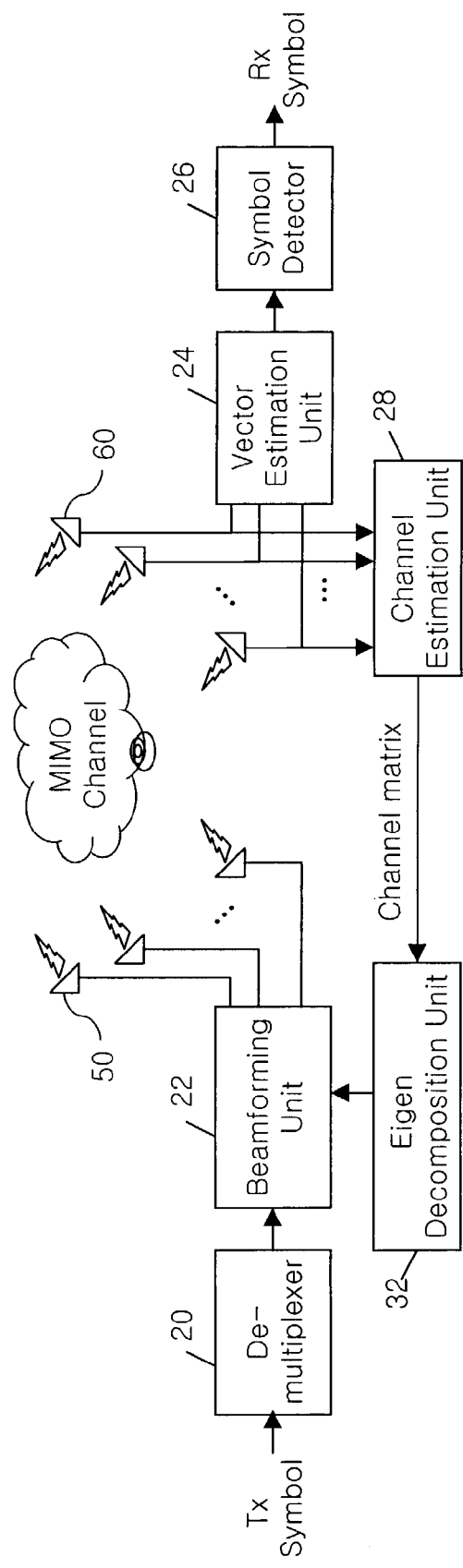
FIG. 7 illustrates the construction of a signal transmission apparatus for a mobile communication system using multiple antennas in accordance with a third embodiment of the present invention.

FIG. 7 illustrates the construction of a signal transmission apparatus for a mobile communication system using multiple antennas in accordance with a third embodiment of the present invention.

As shown in FIG. 7, the signal transmission apparatus in accordance with the third embodiment of the present invention has such a construction that, rather than both the channel estimation unit 28 and the eigen decomposition unit 32 are positioned in the receiving end, the channel estimation unit 28 is positioned in the receiving end while the eigen decomposition unit 32 is positioned in the sending end.

Figure 8:
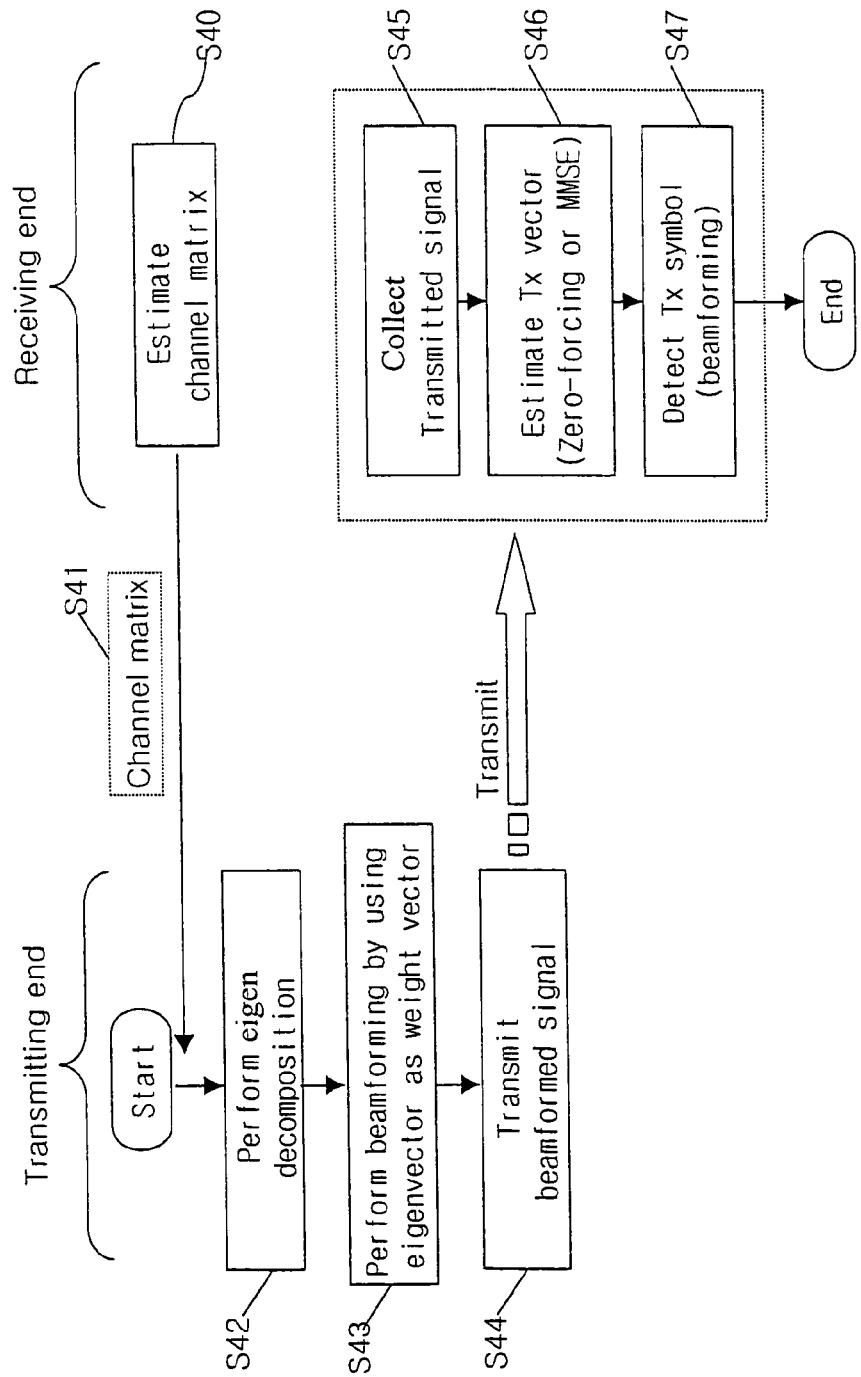
FIG. 8 is a flow chart of a signal transmission method of FIG. 7.

Accordingly, as shown in FIG. 8, when the channel estimation unit 28 of the receiving end estimates a channel matrix ($\underline{H}$) and feeds it back to the sending end (steps S40 and S41), as stated above, the eigen decomposition unit 30 of the sending end performs an eigen-decomposition of the $\underline{H}^H \times \underline{H}$ to obtain eigenvalues ($\lambda_1, \lambda_2, \lambda_3, \ldots, \lambda_M$) and eigenvectors ($\underline{e}_1, \underline{e}_2, \underline{e}_3, \ldots, \underline{e}_M$) (step S42).

Once the eigenvalues ($\lambda_1, \lambda_2, \lambda_3, \ldots, \lambda_M$) and the eigenvectors ($\underline{e}_1, \underline{e}_2, \underline{e}_3, \ldots, \underline{e}_M$) are obtained, the beamforming unit 22 replaces the eigenvectors ($\underline{e}_1, \underline{e}_2, \underline{e}_3, \ldots, \underline{e}_M$) with weight vectors ($\underline{w}_1, \underline{w}_2, \underline{w}_3, \ldots, \underline{w}_M$), performs a beamforming on each symbol (step S43), and transmits the beamformed signal through each transmit antenna 50 (step S44).

Similar to the second embodiment of the present invention, signals transmitted from the sending end are collected through the receive antennas 60 of the receiving end (step S45). The vector estimation unit 24 of the receiving end estimates a transmission signal vector (transmit vector) by using the zero-forcing or the minimum mean square error (MMSE) method (step S46). In general, in the MIMO mobile communication system, the receiving end is aware of the modulation method used in the sending end. Thus, the symbol detector 26 recognizes positions of the estimated symbols from the constellation and finally detects the trans mit symbols (step S47). Thereafter, the receiving end checks whether every symbol has been detected and if there still remains a symbol to be detected, the operations from step S45 to step S47 are repeatedly performed.

In this manner, in the signal transmission apparatus for a mobile communication system adopted to the frequency division duplex (FDD) system, the weight vector to be inner-producted to each symbol is received from the receiving end or only the channel matrix is inputted form the receiving end, and then, the corresponding channel matrix is eigen-decomposed to calculate a weight vector.

Thus, it can be said that the constructions of the signal transmission apparatuses as shown in FIGS. 5 and 7 are considered to be basically the same to each other but merely different depending on which information is fedback.

Figure 9:
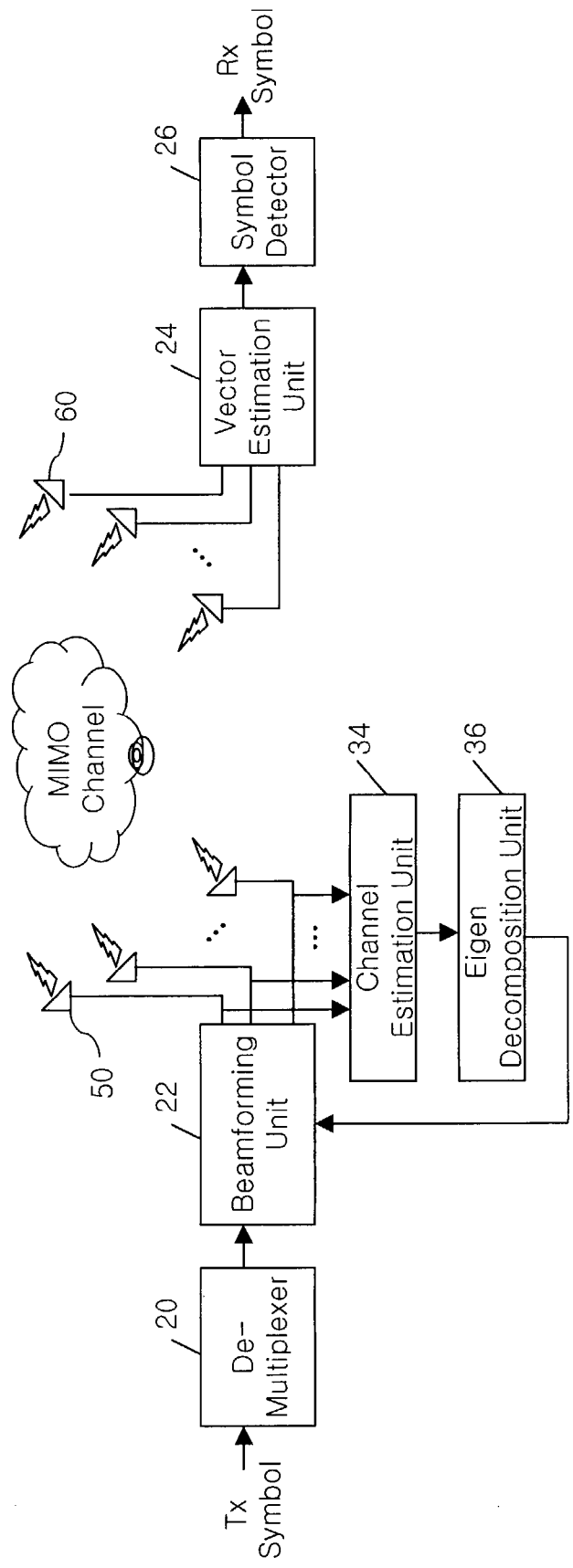
FIG. 9 illustrates the construction of a signal transmission apparatus for a mobile communication system using multiple antennas in accordance with a fourth embodiment of the present invention.

FIG. 9 illustrates the construction of a signal transmission apparatus for a mobile communication system using multiple antennas in accordance with a fourth embodiment of the present invention, adopting the FDD system.

Referring back to the TDD system, since the forward channel and the backward channel are the same to each other, the sending end does not need to receive any channel information from the receiving end. Thus, in the fourth embodiment of the present invention, a channel estimation unit 34 for estimating a channel matrix and an eigen decomposition unit 36 for performing an eigen-decomposition are all positioned in the sending/receiving end.

The channel estimation unit 34 of the sending end estimates a forward channel matrix ($\underline{H}$) and the eigen decomposition unit 36 performs an eigen-decomposition of the estimated channel matrix ($\underline{H}$) and obtains an eigenvalue and an eigenvector.

Then, the beamforming unit 22 employs the obtained eigenvector as a weight vector, inner-products each symbol demultiplexed in the demultiplexer 20 by the weight vector, performs a beamforming on each symbol and transmits them. The following operations are the same as those after the step S44, descriptions of which are thus omitted.

As so far described, in the MIMO system of the present invention, the beamforming is performed on each symbol using the correlation as well as the independence between antennas, and then the beamformed symbols are transmitted.

Thus, unlike in the system using the independence between antennas as in the conventional art in which the signal gain is degraded as the correlation between antennas becomes great, in the present invention, both the correlation between antennas and the independence between antennas are all considered, so that the gain according to the correlation between antennas can be also obtained.

In addition, the additional gain would lead to enhancement of the symbol detection capability of the sending end, resulting in that performance of the MIMO system can be remarkably heightened.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A signal transmission method for a mobile communication system using multiple antennas comprising:

receiving a channel matrix from a receiving end;
eigen-decomposing the channel matrix and calculating an eigenvector and an eigenvalue;
performing a beamforming on a symbol, the beamforming being performed by multiplying each symbol by the eigenvector, a power level of each symbol being adjusted in proportion to the calculated eigenvalue; and
transmitting the beamformed signal through a plurality of transmit antennas.

2. The method of claim 1, wherein the eigenvector is calculated in a sending end.

3. The method of claim 1, wherein each symbol is a demultiplexed symbol.

4. A signal transmission method for a mobile communication system using multiple antennas comprising:
receiving an eigenvector and an eigenvalue from a decomposition unit at a receiving end;
performing a beamforming by multiplying each symbol by the eigenvector, a power level of each symbol being adjusted in proportion to the received eigenvalue; and
transmitting the beamformed signal through each transmit antenna.

5. A signal transmission apparatus for a mobile communication system using multiple antennas comprising:
a demultiplexer for demultiplexing sequentially inputted symbols;
an eigen decomposition unit for producing an eigenvector and an eigenvalue;
a beamforming unit for performing a beamforming on each demultiplexed symbol, the beamforming being performed by multiplying each symbol to be transmitted by the eigenvector, the beamforming unit adjusting a power level of each symbol in proportion to the eigenvalue; and
a plurality of transmit antennas for transmitting the beamformed signals.

6. The apparatus of claim 5 further comprising:
a vector estimation unit for estimating a transmit vector from the collected signals; and
a symbol detector for performing a beamforming on the estimated transmit vector and detecting a transmit symbol.

7. The apparatus of claim 6, wherein the vector estimation unit estimates the transmit vector by using a zero-forcing or a minimum mean square error (MMSE) method.

8. The apparatus of claim 5 further comprising:
a channel estimation unit for estimating a channel matrix from the collected signals.

9. The apparatus of claim 5, wherein the eigenvalue is one of calculated in the sending end or fed back from the receiving end.

10. A signal transmission apparatus for a mobile communication system using multiple antennas comprising:
a demultiplexer, the demultiplexer demultiplexing sequentially inputted symbols;
an eigen decomposition unit, the eigen decomposition unit eigen-decomposing a channel matrix fed back from a receiving end and calculating an eigenvector and an eigenvalue;
a beamforming unit, the beamforming unit performing a beamforming on each symbol by using the calculated eigenvector, the beamforming unit adjusting a power level of each symbol in proportion to the eigenvalue; and
a plurality of transmit antennas for transmitting beamformed signals.

11. The apparatus of claim 10 further comprising:
a plurality of receive antennas, the plurality of receive antennas collecting transmitted signals;
a vector estimation unit, the vector estimation unit estimating a transmit vector from the collected signals;
a symbol detector, the symbol detector performing a beamforming on the estimated transmit vector and detecting a transmit symbol; and
a channel estimation unit, the channel estimation unit estimating a channel matrix from the collected signals and feeding it back to the eigen decomposition unit.

* * * * *